United States Patent [19]
Baldwin

[11] 3,779,018
[45] Dec. 18, 1973

[54] MASTER CYLINDERS
[75] Inventor: Philip Sidney Baldwin, Florence, Italy
[73] Assignee: FIAT Societa per Azioni, Turin, Italy; a part interest
[22] Filed: Mar. 15, 1972
[21] Appl. No.: 234,837

[30] Foreign Application Priority Data
Mar. 27, 1971 Italy..................68038A/71

[52] U.S. Cl. .............................................. 60/575
[51] Int. Cl. ............................................... F15b 7/08
[58] Field of Search .................................................
60/54–54.6 E, 54.6 R, 54.6 A, 575

[56] References Cited
UNITED STATES PATENTS
| | | | |
|---|---|---|---|
| 3,191,384 | 6/1965 | Kruscmash | 60/54.6 A |
| 3,487,641 | 1/1970 | Hackett | 60/54.6 R |

FOREIGN PATENTS OR APPLICATIONS
| | | | |
|---|---|---|---|
| 652,635 | 2/1963 | Italy | 60/54.6 E |

*Primary Examiner*—Martin P. Schwadron
*Assistant Examiner*—A. M. Zupcic
*Attorney*—Richard C. Sughrue et al.

[57] ABSTRACT

The invention relates to a master cylinder for a hydraulic fluid system such as the hydraulic braking system of a motor vehicle. The cylinder has a main piston and an auxiliary piston between which there is a precompressed spring which transmits movement of the auxiliary piston, caused by its engagement with a push rod operated by the brake pedal, to the main piston. The main piston has two passageways by means of which the space between the main and auxiliary pistons can communicate with a reservoir of hydraulic fluid for the circuit. One of the passageways is controlled by a valve which closes under the action of a flow of fluid from the said space toward the reservoir, and the other is controlled by a valve, linked to the auxiliary piston, which is closed after a predetermined approach of the auxiliary piston towards the main piston against the action of the precompressed spring.

5 Claims, 2 Drawing Figures

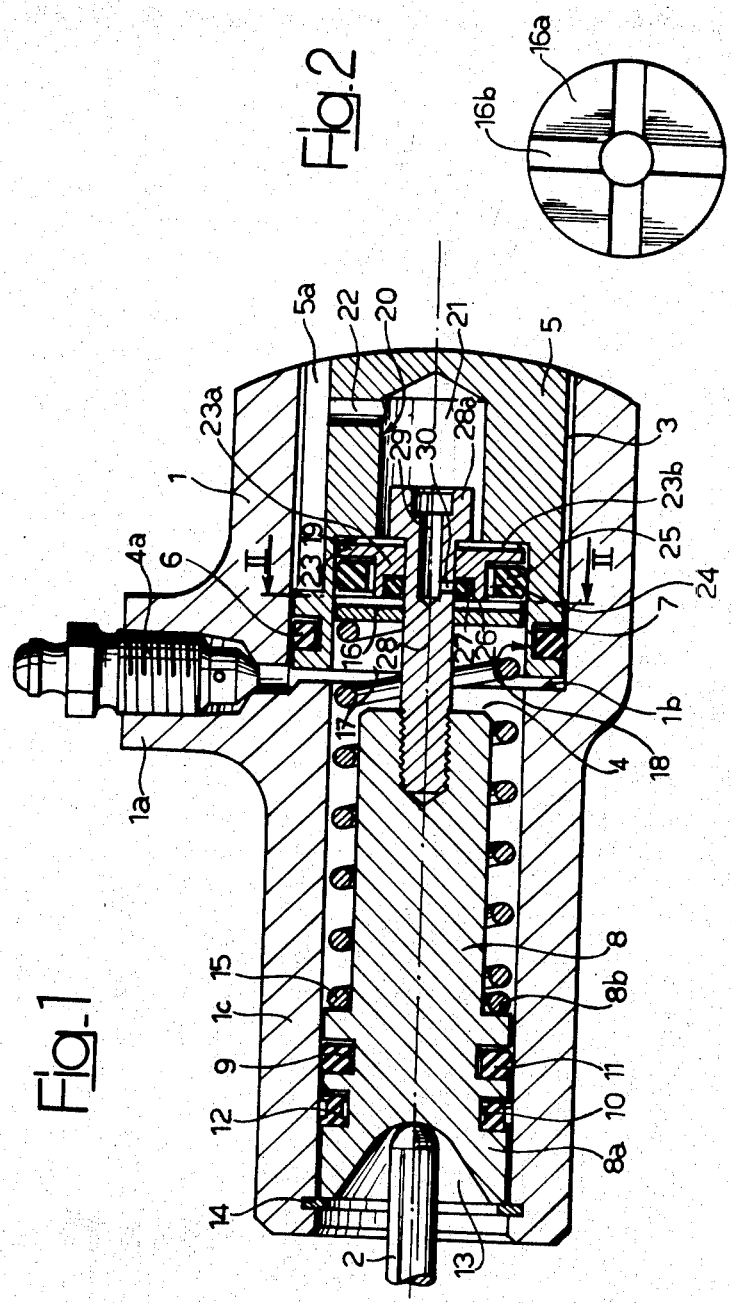

MASTER CYLINDERS

BACKGROUND OF THE INVENTION

The present invention relates to master cylinders, and particularly to master cylinders for the hydraulic braking systems of motor vehicles.

Master cylinders with built-in suppressors are already known. In such master cylinders there is provided a main piston which slides within the cylinder against the action of a return spring, and an auxiliary piston interposed between the main piston and a push rod controlled by the brake pedal. The auxiliary piston has a smaller diameter than the main piston and the section of the cylinder within which the auxiliary piston slides is smaller than the diameter of that part of the cylinder housing the main piston. In master cylinders of this type a precompressed spring is interposed between the main and auxiliary pistons and in the main piston there is a passage which connects the space between the main and auxiliary pistons with the hydraulic fluid reservoir, this passage being controlled by a valve, part of which is carried by the auxiliary piston, which remains open until the precompressed spring interposed between the two pistons has undergone a certain further compression.

Master cylinders of this type will hereafter be referred to as "master cylinders of the type defined." Such cylinders have a disadvantage, due to the structure of the valve which controls the passage between the chamber which is between the main piston and the auxiliary piston, and the reservoir, in that the spring interposed between the main and auxiliary pistons, has a rigidity coefficient of high value, which is independent of the pre-loading of the spring.

This means that the valve controlling the flow of fluid through the main piston operates at a rate which is substantially independent of the rate of movement of the auxiliary piston.

SUMMARY OF THE INVENTION

According to the present invention there is provided a master cylinder of the type herein defined, characterised in that the space between the main piston and auxiliary piston communicates with the reservoir by means of two valves which control fluid flow through two paths in the main piston; the first of these valves being controlled exclusively by the flow of hydraulic fluid and being formed in such a way as to permit the flow of fluid towards the space between the main piston and auxiliary piston from the reservoir and to prevent the flow of fluid towards the reservoir from the said space, the second valve being formed in such a way as to be open when the main and auxiliary pistons are in their respective rest positions, and to close after a predetermined relative movement between the auxiliary piston and the main piston against the action of the precompressed spring interposed between these pistons.

OBJECTS OF THE INVENTION

One object of the invention is to provide a master cylinder of the above type in which the first valve comprises a substantially circular valve member slidably mounted on a rod carried by the auxiliary piston and located in a chamber within the main piston which is provided with passageways which connect the said chamber to the reservoir, the valve member having an annular recess within which there is mounted, with axial and radial play, a resilient sealing ring having a substantially rectangular cross section with an arcuate periphery.

Another object of the invention is to provide a master cylinder of the above type in which the second valve includes an O-ring of resilient material housed in an annular groove in a radial face of the said valve member and in contact with the said rod on which the valve member is slidably mounted, the rod having an axial passageway communicating with the said passages in the main piston which communicate with the reservoir, and at least one radial opening communicating with the axial passageway and so situated as to be partially uncovered by the O-ring when the two pistons are in their respective rest positions and to be covered and sealed by the O-ring upon approach of the auxiliary piston to the main piston against the action of the said precompressed spring.

A further object of the invention is to provide a master cylinder of the above type in which there is an annular washer adjacent the said valve member, against which bears one end of the said precompressed spring, the washer fitting within the chamber within the main piston with radial play and being provided, on the face adjacent the said valve member, with a plurality of radial grooves by means of which the said O-ring of the valve member communicates with the space between the main piston and the auxiliary piston.

Yet another object of the invention is to provide a master cylinder of the above type in which the said valve member is provided with a plurality of radial ribs or grooves in the face opposite that against the said washer, the valve member bearing against a radial shoulder in the chamber within the main piston, the larger diameter of the shoulder corresponding to the diameter of the chamber in which the auxiliary piston slides, and the valve member being urged against the said radial shoulder by the washer which is urged by the precompressed spring. In an embodiment of the invention formed in accordance with the above objects it is convenient if the free end of the rod on which the valve member is slidably mounted, has an enlarged head to retain the valve assembly comprising the valve member and the washer which are urged towards the head by the said precompressed spring.

Further features and advantages of the present invention will become apparent during the course of the following detailed description with reference to the accompanying drawings which is given purely by way of nonrestrictive example.

BRIEF DESCRIPTION OF THE DRAWINGS

FIG. 1 is a longitudinal section of the rear portion of a master cylinder constructed as an embodiment of the invention; and FIG. 2 is a front view of one of the elements of the valve system of the embodiment of FIG. 1, which occupies a position indicated by the line II—II of FIG. 1.

DESCRIPTION OF THE PREFERRED EMBODIMENTS

Referring now to the drawings, part of the casing 1 of a master cylinder constructed as an embodiment of the invention is shown. The part of the master cylinder 1 which communicates with the braking circuit is not shown since it is not relevant to the present invention. The parts of the cylinder which are shown are: the housing 1 for a main piston 5, a boss 1a which houses a bleed valve 4a, a shoulder 1b which defines the interface between the portion 3 of the cylinder 1 which houses the main piston 5, and a portion 1c within which slides an auxiliary piston 8. The auxiliary piston 8 and the internal bore of the portion 1c of the cylinder 1 are of smaller diameter than the bore of that part of the cylinder 1 which houses the main piston 5. A push rod 2 engages the end of the auxiliary piston 8 remote from the main piston 5.

The chamber 3 of the cylinder 1 communicates with a chamber 4 in the portion 1c of the cylinder casing 1. The main piston 5 is of slightly smaller diameter than the chamber 3 of the cylinder bore and carries at the end which is nearest the shoulder 1b a sealing ring 6. This sealing ring is made of a resilient material, such as rubber, having in cross section a shape which is substantially rectangular with an arcuate section on that part of the ring which is in contact with the cylindrical wall of the portion 3 of the cylinder 1. The ring 6 is housed, with axial and radial play, in an annular recess 7 in the periphery of a skirt portion of the piston 5 which is adjacent the shoulder 1b. The piston 5 also has a longitudinal peripheral recess 5a into which penetrates the end of a tubular connector (not illustrated) which connects the chamber 3 of the bore of the cylinder 1 to an hydraulic fluid reservoir tank (also not illustrated).

The piston 5 is also formed, in a known way, at that part of the portion opposite the shoulder 1b, with a sealing coupling which acts as a valve to control the communication between the part 3 of the bore of the cylinder 1 connected with the fluid reservoir and that part (not shown) which is connected with the pipes communicating with the wheel brake cylinder (not illustrated). The main piston 5 is, moreover, biased, by means of a spring (not illustrated) which is located in the portion 3 of the bore of the cylinder, towards the shoulder 1b.

Within the chamber forming the portion 4 of the cylinder 1 there is slidingly assembled, as mentioned above, the auxiliary piston 8 which has a head 8a of greater diameter than the main part 8 of the piston, and which is assembled with radial play in the portion 4 of the bore. The head 8a has two annular peripheral recesses, 9 and 10 respectively which each house sealing rings 11 and 12 respectively. The end face of the head 8a is formed into a seating 13 for locating and supporting the push rod 2. Between the piston 8 and the piston 5 there extends a spring 15 which transmits the bias of the piston 5 so that the piston 8 normally bears against an internal circlip 14 housed in an annular recess in the cylindrical wall of the portion 4 of the inner bore of the cylinder 1, adjacent the end of the portion 1c thereof.

The helical spring 15 surrounds the main portion 8 of lesser diameter of the auxiliary piston and bears against a face 8b which forms a shoulder between the main portion 8 and the head 8a. In addition, the helical spring 15 is preloaded by the above mentioned spring (not illustrated) acting upon the main piston 5.

The other end of the spring 15 bears against a washer 16 located with a small amount of radial play within a chamber 17 defined by the skirt of the piston 5. The diameter of the chamber 17 is substantially equal to the diameter of the chamber 4 of the portion 1c of the bore of the cylinder 1, and the portion 18 of the skirt of the piston 5 has a radial shoulder 19 between itself and a cylindrical wall 20 which defines a chamber 21 which is, in effect, an extension of the chamber 17 and which communicates through a radial passage 22 with the longitudinal peripheral recess 5a of the main piston 5. The washer 16 bears with one radial face 16a, in which are a plurality of radial grooves 16b, against the boss 23a of a flanged washer 23 which also has a central aperture, and which is also assembled with a small amount of radial play within the chamber 17 inside the piston 5. The washer 23 also has radial ribbings or groovings 23b in the face which bears against the radial shoulder 19.

The flanged washer 23 defines, together with the washer 16, an annular recess 24 within which is located a resilient sealing ring 25 which is, preferably, made of rubber. This sealing ring 25 also has a substantially rectangular cross section with one arcuate side which is in contact with the cylindrical wall 18 of the skirt of the piston surrounding the space 17. The dimensions of the ring 25 are such that it is housed in the annular recess 24 with a certain amount of axial and radial play. In the face of the boss 23a of the washer 23 there is formed an annular recess 26 which houses a sealing ring 27. The ring 27 is circular in cross section and also made from resilient material, preferably rubber.

The washer 16 and the washer 23 with its boss 23a are fitted on to a cylindrical rod 28 which is screwed in to the end of the portion 8 of the auxiliary piston, and the dimensions of the annular groove 26 which houses the O-ring 27 are such that the ring is slightly compressed against the periphery of the rod 28.

At the end of the rod 28 is formed a head 28a of greater diameter than the rod 28 and which is located in the chamber 21 within the piston 5, which chamber communicates with the axial groove 5a. Through the head 28 there is formed an axial passageway 29 which is connected to the periphery of the rod 28 by means of at least one radial passageway 30, which opens adjacent the O-ring 27 when the parts of the assembly are in the rest position as shown in FIG. 1 of the drawings, and is of such a size that the O-ring 27 does not completely cut off communication between the passageway 30 and the chamber 17 of the piston within which the valves are housed, and which communicates with the portion 4 of the bore of the cylinder 1.

The dimensions and pre-loading of the spring 15 are chosen, in relation to those of the spring (not illustrated) which acts upon the piston 5, in such a way that in the rest position the main piston 5 is slightly spaced from the radial shoulder 1b of the bore of the cylinder 1.

OPERATION

When the brake pedal (not illustrated) is depressed a thrust via the rod 2 is exerted upon the auxiliary piston 8; this piston does not move relative to the main piston 5 until the length of the pre-loaded spring 15 is altered. Consequently, the main piston 5 will move, initially, against the action of the biasing spring (not shown) which yields, in order to close the relative valve (not illustrated) which controls the communication of the cylinder with the reservoir and to increase the pressure within the brake cylinder to commence the operation of the brakes.

In this first operating stage whilst the main piston 5 and the auxiliary piston 8 move together without changing their distance apart, the communication between the inner chamber 21 of the piston 5 and the portion 4 of the bore of the cylinder remains open. The fluid can thus flow in from the reservoir (not illustrated) through the longitudinal groove 5a and the passage 22 to the chamber 21 from which it flows via the space between the radial shoulder 19 and the washer 23 and between the flange of the washer 23 and the sealing ring 25, and thence through the radial grooves of the washer 16 to the chamber 4. The sealing ring 25 is displaced by a small amount, in the region of one tenth of a millimetre to allow the passage of the fluid between itself and the radial flange of the washer 23.

When the thrust exerted upon the auxiliary piston 8, after having overcome the resistance opposing the advance of the main piston, increases to a value sufficient to start compressing the pre-load spring 15, then the auxiliary piston 8 moves with respect to the piston 5 and there if a flow of liquid from the chamber 17 towards the chamber 21 which immediately moves the sealing ring 25 against the washer 23 closing this route of communication between the chambers 17 and 21.

At the same time, the rod 28, after being moved a short distance, in the region of one-half millimetre, moves the outlet of the passageway 30 away from the O-ring 27 and thereby shuts off the alternative route of communication between the chambers 17 and 21, (that is the route through the passageways 29 and 30). This means that the stroke of the auxiliary piston 8, with respect to the main piston 5, required to stop the flow of fluid through the valves consisting of the sealing rings 25 and 27, is very short, in the region of one-half millimetre.

From the position at which the communication between the chambers 17 and 21 is blocked, the whole of the hydraulic pressure which exists in the portion 4 of the bore of the cylinder is exerted upon the main piston 5.

Subsequently, by increasing the thrust on the brake pedal, the auxiliary piston 8 continues to move until such time as the working pressure of the brake assumes a constant standard value.

Upon release of pressure from the thrust rod 2, the pistons 5 and 8, return backwards under the action of their respective springs, and the fluid previously transferred through the main piston 5 returns through the radial passageway 30 which returns to the original partially uncovered position adjacent the O-ring 27.

From the above description it will be apparent that the spring 15 must have an initial pre-load sufficient to allow movement of the main piston 5 without the spring flexing and thereby lengthening the required stroke of the push rod 2.

The construction described above, which includes a valve consisting of the sealing ring 25 floating in its seating and controlled by the flow of fluid, has the advantage that closing of this valve is dependent on the movement of the auxiliary piston 8; that is the valve closes faster if the piston 8 moves faster. Thus it is not necessary for the pre-loaded spring 15 to have a high rigidity apart from the pre-load, as is required in the case of the reviously known valves which have indirect mechanical control by a reaction spring, and in which the time required for blocking the communication between the chambers on either side of the main piston is always constant. In the previously known valves a high rigidity of this spring was required in order to prevent the passage of a considerable volume of fluid through the valve in the closed stage of the valve during rapid braking.

Within the scope of the invention defined herein the details of construction may be widely varied from what has been described and illustrated above, for example, in addition to master cylinders for single braking circuits, embodiments of the invention can be constructed as master cylinders for the control of double braking circuits of motor vehicles, that is in cases where the brakes of the rear wheels and front wheels respectively are controlled by two separate pistons sliding in a single cylinder.

What is claimed is:

1. In a master cylinder for a fluid circuit such as a brake circuit, of the type comprising, a cylindrical body, a main piston sliding in a bore within said cylindrical body, a main spring biasing said main piston towards one end of said cylindrical body, an auxiliary piston in an extension of said bore in said one end of said cylindrical body, said auxiliary piston defining a space between itself and said main piston, a precompressed spring between said auxiliary piston and said main piston, said precompressed spring urging said main piston and said auxiliary piston apart, two parallel routes formed through said main piston and connecting said space in said cylinder between said main piston and said auxiliary piston with a reservoir of said fluid circuit, first valve means controlling one route through said piston, said first valve means being controlled exclusively by the fluid flow past said valve means to permit the flow of fluid from said reservoir towards said space between said pistons when said main and auxiliary pistons are in their respective rest positions and prevent the flow of fluid from said space between said pistons towards said reservoir when said auxiliary pistons moves relative to said main piston, second valve means controlling the other said route through said piston, said second valve means being open when said main and auxiliary pistons are in their respective rest positions and closing after a predetermined relative movement between said auxiliary piston and said main piston against the action of said precompressed spring between said pistons, the improvement wherein said first valve means includes a substantially circular valve member, a rod mounted on said auxiliary piston, a chamber in said main piston, said rod extending into said chamber, said substantially circular valve member being slidably mounted on said rod and within said chamber, a first annular sealing ring between said valve member and said rod, passageways in said main piston, communicating with said chamber, an annular recess in said substantially circular valve member, a second annular sealing ring in said annular recess, said second sealing ring being shaped such that it is mounted with axial and radial play in said recess in said valve member and bears against the surface of said chamber in said piston.

2. The master cylinder of claim 1 wherein said second valve means includes,
an axial passageway in said rod,
a radial passageway in said rod, said radial passageway communicating with said axial passageway,
an annular groove in a radially inner face in said substantially circular valve member,
said first annular sealing ring being located in said annular groove in said valve member, said first sealing ring contacting said rod adjacent the outlet of said radial passageway, partially covering said outlet when said main and auxiliary pistons are in their rest positions, and covering said outlet to seal said radial passageway when said auxiliary piston has moved a predetermined distance toward said main piston against the action of said precompressed spring.

3. The master cylinder of claim 2 wherein there is provided an annular washer on said rod adjacent said valve member and defining with said member said annular recess, the diameter of said washer being smaller than the diameter of said chamber in said main piston, said washer being positioned adjacent one end of said precompressed spring to receive the thrust therefrom and being provided with radial grooves on the side thereof facing said valve member, said grooves allowing said fluid to flow between said washer and said second sealing ring and said washer and said valve member such that said space between said main piston and said auxiliary piston communicates with said opening in said rod.

4. The master cylinder of claim 3 wherein said substantially circular valve member is provided with a plurality of radial recesses in the face thereof opposite that against which bears said annular washer,
a radial shoulder in the wall of said chamber in said main piston, the larger diameter of said shoulder corresponding to the diameter of that part of said chamber in said cylinder, within which slides said auxiliary piston, said valve member being urged against said shoulder by the thrust of said precompressed spring transmitted by said washer.

5. The master cylinder of claim 1 wherein said rod has an enlarged head on the free end thereof, said head retaining said valve member and said washer in position during assembly of said master cylinder.

* * * * *